Feb. 17, 1970   R. W. YOUNG, JR   3,495,448
TESTING DEVICE AND PROCESS FOR ITS FABRICATION
Filed Jan. 30, 1967

INVENTOR.
Roy W. Young, Jr.
BY
Christie, Parker & Hale
ATTORNEYS

United States Patent Office 3,495,448
Patented Feb. 17, 1970

3,495,448
TESTING DEVICE AND PROCESS FOR ITS
FABRICATION
Roy W. Young, Jr., La Canada, Calif., assignor to
Drilube Co., Glendale, Calif., a corporation of
California
Filed Jan. 30, 1967, Ser. No. 612,614
Int. Cl. G01n 3/08, 3/28, 17/00
U.S. Cl. 73—95                                    13 Claims

ABSTRACT OF THE DISCLOSURE

A materials testing device which has a notched pin held in pure tension by a ring and a keeper. The device is fabricated by applying a tension force on the pin which is correlated with the tensile stress desired at the notch. The reaction force to the tensile force is applied to elastically deform the ring. The ring and pin in their stressed state are secured together such that the ring maintains the desired tensile stress in the notched portion of the pin.

Background of the invention

This invention relates to the art of materials testing in general and, in one form, to a testing device which is especially suited for endurance stress testing by determining failures from the combined effect of stress and material degradation over a period of time, and to a process for its fabrication.

Materials testing takes several forms of which the observation of a specimen under pure tension is one of the most desirable because performance under tension is readily reducible to design criteria for many loading conditions and part configurations. Material performance as such is also observable in tensile tests, for example, the testing of the strength of a weld to determine flaws in the weld metal or inadequacies in welding conditions. One of the most critical areas of materials testing is in the determination of likely performance of a part in material degrading environments which give rise to failures resulting from such agencies as stress corrosion and embrittlement.

Stress corrosion and embrittlement failures have been known for many years. These failures are normally manifested in parts which are continuously under load and have been subjected to some form of corrosive or embrittling atmosphere. Inevitably, failure occurs below the normal ultimate stress level of the part. The mechanism of failure, while not completely understood, appears to reside in the weakening of the grain boundaries of the crystalline structure of the material. Various atmospheres and environments tend to promote material degradation. Hydrogen embrittlement of steel, for example, often results when a part is cadmium-plated. Despite sophisticated design and process control criteria, which take into account various modes of stress failure, failure problems continue.

Various techniques have been formulated and applied in an effort to predict the failure of parts which are susceptible to stress corrosion and embrittlement. One device is in the form of a C-ring which is subjected to stress by a wedge inserted to expand the ring. The stressed ring is then subjected to an environment common to that experienced by the parts of concern. A second testing device employs a ring with a slug for maintaining a predetermined hoop stress. Another device employs a ring which stresses a pin by a force on the ring directed transverse to the axis of the pin. The force may be applied by a clamp and maintained by a rod. These devices, in addition to such classic ones as the standard notched tensile specimen, all have their shortcomings. In general, the devices which employ a ring have not been reliable in endurance stress testing or in predicting stress corrosion and embrittlement failures because the stress in the ring is too complicated for accurate and simple correlation to design and process conditions. A notched tensile specimen requires the use of expensive and bulky machinery for a considerable period of time for, regardless of the test device employed, an effective test requires several days or weeks to allow the failure mechanism to take full effect. Thus there is a need for a simple, accurate and reliable testing device which is especially suited for endurance stress testing to indicate failures due to such factors as stress corrosion and embrittlement.

Summary of the invention

The testing device of the present invention takes the form of a stressed ring which holds a member, such as a pin or band, in pure tension. The member such as a test section between its two ends, the performance of which is observed under the conditions desired. This test section may take the form of a weakened portion defined by a notched or relieved section, or may, for example, be a weld. The test section of the member is maintained at a predetermined pure tensile force by the ring which is deformed in reaction to the stress in the member. To maintain this stressed state, keeper means are provided which constrain the member in two diametrically opposed holes in the ring. The deformation of the ring is defined by a foreshortened axis along the line of the member and by an elongated axis transverse to this line.

Preferably, the ring is prestressed prior to its assembly with the member. The prestress is in excess of the stress level imposed by the member and sufficient to deform the outer circumferential portions of the ring. The prestressed ring insures its elastic deflection under the load imposed by the member which allows an easy determination of the amount of tensile stress in the weakened section of the member by the deflection of the ring because the ring may be calibrated to indicate the amount of stress required to deflect the ring a given amount; the deflection then becomes a known and repeatable quantity which can be applied to determine the stress level in the test section of the assembled testing device.

The member is preferably held in the ring by a head and a swaged collar. The head is on one end of the member outside of and in contact with the ring. The other end of the member has at least one circumferential groove or step outside the ring. The collar is swaged into interlocking engagement with the groove while the member is under tension and the ring deformed in reaction to the tension.

The subject invention also encompasses the process for fabricating the testing device just described. The member, which has a keeper on one end, is inserted through two diametrically opposed holes in the ring until the keeper abuts the ring. A pure tensile force is applied to the member to stress its test section to the desired level. The reaction force to this tensile force is applied to the ring. The member is secured in the ring in such a manner that the reaction and tensile forces are maintained. Preferably, the member is secured by swaging a collar about circumferential grooves disposed at the end opposite the first keeper. The reaction force is applied to swage the collar and in turn to stress the ring. It has been found that the ring and member can be effectively fabricated when the member has a gripping portion outside the attachment portion, that is, outside the portion of the member which is fitted with the collar. The tensile force is then applied to the gripping portion, the reaction force of which is applied to the ring through the collar. If desired, the gripping portion may be separated from the attachment portion by a break neck groove. The break neck groove is designed to fail in tension at approximately the tension force required to produce the desired stress level in the test section. The gripping portion is also useful in one of the preferred methods of fabricating the device wherein the tensile stress in the test section may be applied to any desired level simply by noting the ring's deflection during the tensioning of the test section through the gripping portion. When a collar is employed to hold the tensioned member within the ring, the collar will undergo a dimensional change after the swaging process resulting in a loss of tension in the member. To compensate for this force loss, it is preferred practice to initially stress the member in excess of the amount desired at the test section. The excess tension corresponds to the amount of tension loss of the collar which the member will feel, thus producing the desired final tensile stress.

Other preferred steps in the fabrication of the testing device are directed to its ultimate use and to the fabrication of a notch in the test section of the member's shank. It is important that the notch have reproducible failure characteristics. In order to eliminate the influence of excessive temperature in the notch's fabrication, with its concomitant unpredictable effect on the notch's failure, it is desirable to form the notch such that its neighboring material does not overheat. In addition, it is desirable to maintain close dimensional tolerances in the finished notch. It has been found that a two-step fabrication process avoids adverse heat effects and results in extremely fine dimensional control. The initial step requires that the notch be ground to a dimension slightly in excess of that desired. The notch is finished by drawing a strand, such as nylon, across the notch while it has relative rotation with respect to the strand. Preferably, the strand is of a monofilament material because this material has a true circular cross section. The strand and/or notch are disposed in an abrasive bath, for example, a bath containing alumina where the abrasive material cooperates with the strand to form the finished notch.

In testing of environments which lead to stress corrosion or embrittlement failures, the testing device, or its member before assembly, is placed in the corrosive or embrittling environment desired. The device may be allowed to remain in the environment until the member fails or it may be removed before failure. In either case, if the member fails at its weakened section, the failure may be correlated with part design, processing conditions, or environment to compensate for expected failure or undesirable material degradation.

The testing device is extremely useful in testing failure inducing material processing environments. The performance of materials which are processed in stress corrosive and embrittling environments, while the materials are under stress, results in an accelerated failure time at a lower stress level. This fact is useful in determining the quality of a processing environment. For example, the plating of the device in an assembled state with the member under tension mirrors the quality of the plating environment more rapidly than would otherwise be the case. On the other hand, processing the testing device's member before assembly allows an exact correlation with parts which are also processed before being stressed.

An example of the device's flexibility is a testing method wherein several test devices, all with different stress levels in the test section, are placed in a plating bath. The failure time of each of the devices is then applied as an indication of the bath's embrittling characteristics.

The testing device is extremely reliable, accurate, simple and easy to use. It may be used as a test device for almost any material degrading environment, for example such material processing conditions as paint stripping, plating and heat treatment. The test results are accurate and easily applied because the test section of the member is under pure tension. In addition, the amount of stress in the test section is readily determined because the test device is easily calibrated and the test section's stress is a sole function of the stress in the ring.

One of the most significant advantages of the present invention resides in the ease of fabricating the testing device to achieve any desired tensile stress in the test section of the member. With knowledge of the amount of ring deflection required to produce a given amount of stress in the test section, measurement of ring deflection during assembly of the test device gives an accurate reading of this stress. For this purpose, the gripping portion outside the attachment portion of the member is useful because it allows the maintenance of tension on the member while the reaction force to the tension is deforming the ring in an amount at least approximating its deflection after the tension load is removed from the gripping portion.

These and other features, aspects and advantages of the present invention will become more apparent from the following description, drawings and appended claims.

Description of the preferred embodiments

Figure 1:
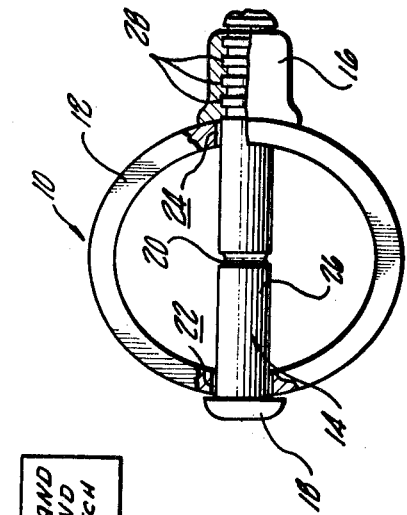
FIGURE 1 is a view, partly in half section, of a preferred form of the testing device of this invention.
Figure 3:
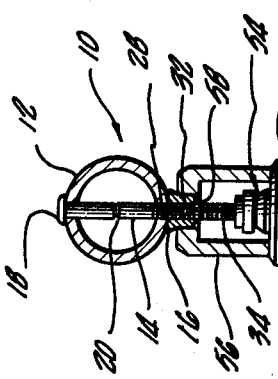
FIGURE 3 illustrates the preferred process for fabricating the test section of the testing device of the present invention.

FIGURE 1 illustrates a preferred form of the testing device of the present invention which is denoted by reference numeral 10. The device in general comprises a stressed ring 12 in which is disposed a tensioned member in the form of pin 14 held in place by collar 16 and head 18. Test section 20, in the form of a circumferential notch is disposed intermediate the ends of pin within ring 12. Pin 14 with its notched portion 20 is held in pure tension by ring 12 which is constrained by collar 16 and head 18. The amount of tension in the pin is determined by the desired stress level in notched portion 20. In many testing applications the notched portion is maintained at seventy-five percent of its ultimate strength.

In its unassembled state, ring 12 is preferably cylindrical. The ring has two diametrically opposed holes 22 and 24 for receiving pin 14. These holes are sized to accommodate pin 14 with a loose fit to insure that the latter is retained in pure tension within the ring. The ring may be fabricated from any suitable material which will maintain the desired stress on notched portion 20; for this purpose 4130 steel is suitable. The pin includes a shank portion 26 which contains notched portion 20. Head 18 forms one end of the pin while locking grooves 28 form the pin's collar attachment portion. Pin 14 is fabricated from a material which will not yield under the predetermined stress desired in the notched portion. Because of the stress levels usually encountered, as high or higher than 160,000 pounds per square inch, the pin is usually of heated treated steel. Head 18 bears against the outer surface of ring 12 adjacent hole 22 and cooperates with collar 16 to maintain pin 14 under tension and ring 12 in a stressed deformed state. Collar 16 is swaged into interlocking engagement with grooves 28 on the attachment end of pin 14. The collar is fabricated from a material which is readily swaged, for example, aluminum, and is generally cylindrical in shape with an axial bore. The end of collar 16 which abuts the outside surface of ring 12 is slightly bell-shaped with a concave surface in contact with the ring. The bell-shaped end and concave surface provide a bearing area in contact with the ring which cooperates with pin 14 to hold the ring in an elastically deformed state. The swaging of the collar will be described in greater detail subsequently. Notched portion 20 is in the form of a circumferential groove within shank portion 26.

This groove forms the weakest portion of the pin and the device and therefore will be the testing device's failing point. In its assembled state, ring 12 is elastically deformed into an ellipse or oval. The minor axis of the oval is coaxial with the longitudinal axis of pin 14. The major axis of the oval is found at right angles to the axis of the pin.

Figure 2:
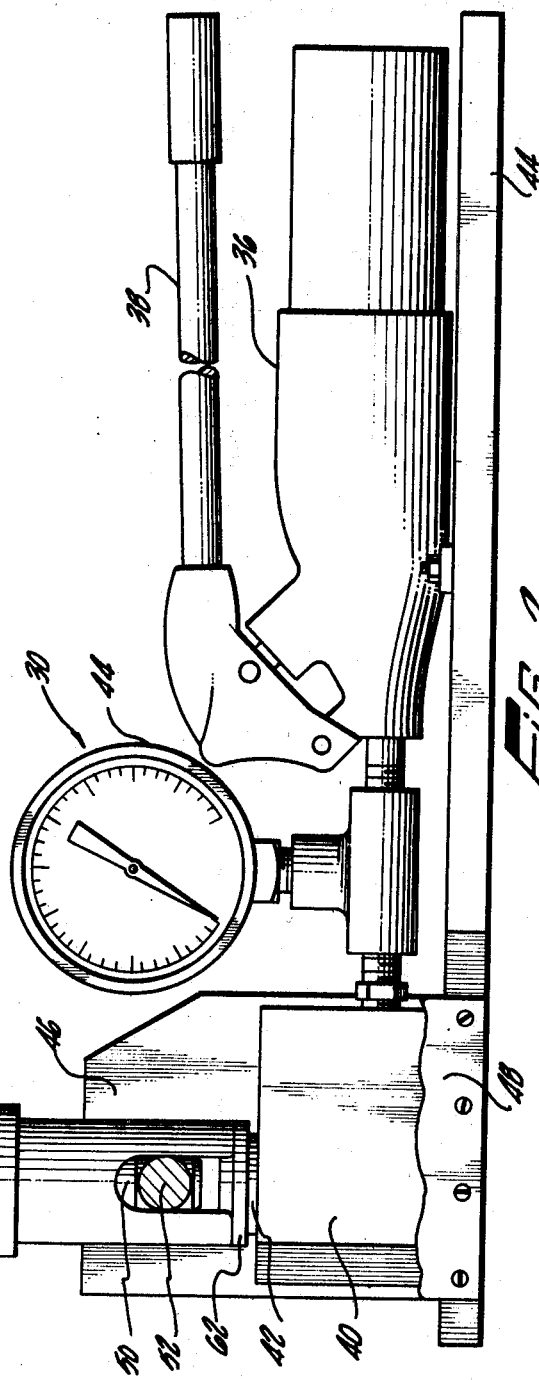
FIGURE 2 illustrates in an elevational view, partly in section, a preferred apparatus for fabricating the testing device illustrated in FIGURE 1.

FIGURE 2 depicts testing device 10 being assembled by tensioning and swaging apparatus 30. This figure also shows the use of a break neck groove and gripping section for pin 14. Break neck groove 32 is outside grooved or attachment portion 28 and separates gripping portion 34 therefrom. The break neck groove may be designed to fail before the notched portion 20 at a point corresponding to the desired stress level in the notch portion. Alternately, the gripping portion may be left on the attachment portion in the finished testing device.

Pin 14, except for circumferential groove 20, may be in the form of a Huck type fastener and may be set in a similar fashion. The Huck fastener and setting methods are described in U.S. Patents 2,531,048, 2,531,049 and 2,754,703, all of which bear the name of Louis C. Huck.

Apparatus 30 is used to assemble testing device 10 and to establish any desired tensile stress in notched portion 20. The apparatus includes hydraulic ram 36 which is actuated by handle 38 to drive a hydraulic fluid into piston assembly 40. Piston 42 of piston assembly 40 responds to the hydraulic pressure within the assembly by elevating. Gauge 44 is disposed between ram 36 and piston assembly 40 to measure the pounds of force acting on piston 42. Base 44 supports the ram and the piston assembly. Side plates 46 and 48, the latter being only partially shown, extend upwardly from their attachment to base 44. These plates hold cylinder 50, through pin 52, stationary with respect to piston 42. Collet 54 is disposed within piston 50. The collet has an axial bore which receives gripping portion 34 of pin 14 to the lock the latter against vertical movement. Head 56 contains an axial bore in the form of a die 58 for swaging collar 16. The head is mounted on sleeve 60 which is capped at its bottom by cap 62. Cap 62 rests on piston 42 to impart the piston's vertical movement to die 58. Cylinder 50 is slidably disposed within sleeve 60.

Upon actuation of ram 36, piston 42 is urged upwardly into pressure contact with cap 62. However, piston 50 is stationary because it is anchored by pin 52. Pin 14 is, therefore, constrained against vertical movement. Die 58 moves upward in response to piston 42 and with respect to collar 16 to swage the latter into interlocking relationship with grooves 28. The bell-shaped and concave configuration, described above, of collar 16 adjacent ring 12 is produced during this swaging process. While collar 16 is being swaged, pin 14 elongates under tension and ring 12 deforms in reaction to the tension. The swaging force is transmitted to ring 12 because the latter is constrained by head 18 of pin 14. Eventually the pin will be anchored in ring 12 by the clamping action of head 18 and swaged collar 16. Break neck 32 may be designed to fail when the desired stress level is reached at notched portion 20, resulting in a finished testing device without the gripping portion.

The device illustrated in FIGURE 2 is very useful for field asembly of testing device 10. With knowledge of the cross sectional area of notched portion 20, any desired tensile stress may be achieved in this portion. The desired tensile stress is accomplished by swaging collar 16 to a level which is indicated by a measurement of ring deflection to correspond to the desired tensile stress. The force indicated by gauge 44 may be correlated with the cross sectional area of the notched portion to give the latter's tensile stress or be used as a preliminary measure of this stress. To insure the adequate swaging of collar 16 into interlocking engagement with grooves 28, it is necessary to have the collar of a softness commensurate with the desired stress level at the notched portion 20. This requirement is readily satisfied through selection of various grades of commercially available materials.

It is preferred practice to prestress ring 12, before the assembly into testing device 10, in excess of the stress it will feel in its assembled state. The stress level should be sufficient to deform the outer circumferential portions of the ring to achieve a known and repeatable deflection of the ring under the load imposed by pin 14 in order that the stress level in the pin can be determined by knowledge of the ring's deflection. As was described above, the ring's deflection is easily correlated with the stress conditions in notched portion 20 to yield a known tensile stress in the notched portion. Thus, ring 12 may be calibrated by observing and noting the deflection of one of its axes at several levels during its prestressing. The deflection in the ring's assembled state will then correspond to a known stress level at the notched portion of pin 14.

It is also preferred practice to stress pin 14 in excess of the value desired in notched portion 20 when testing device 10 is being assembled by tensioning and swaging apparatus 30. During assembly, collar 16 will be constrained against lateral expansion by die 58 but is relatively free from constraint along its length. After the swaging operation, the collar is free to expand somewhat laterally while contracting longitudinally. The longitudinal contraction will allow ring 12 to expand along the line of pin 14 which results in the loss of some of the tension in the pin. The overstressing of the pin, therefore, is correlated with the amount of dimensional change of collar 16 to give the desired predetermined tensile stress in the grooved portion 20.

In any testing device, attention to its fabrication is very important to achieve an accurate indication of the stress conditions in a test specimen. It is important in the fabrication of the testing device of this invention to insure that no stress component other than tensile stress is present in the pin. The holes in the ring through which the pin is disposed, while not critical, should at least be sufficiently large to allow the free passage of the pin during assembly. Notched portion 20 of the pin is preferably fabricated in such a manner that heat induced weakening of the parent metal around the notch is avoided. The preferred method for fabricating the notch requires a pregrinding by known methods to a dimension greater than that desired. The notch is then brought to size in an abrasive bath, for example, a bath containing alumina, by rotating the pin about its longitudinal axis and drawing a strand or thread across the notch. The strand is, of course, under tension and therefore will exert a small force on the periphery of the notch which it contacts. The heat developed in this notch-forming process is rapidly dissipated in the bath with the result that the metal surrounding the notch is not affected by heat. In addition to this advantage, the use of strand cutting also insures accurate dimensional control of the thickness of the notch because the notch will not expand in response to a temperature increase. The strand is preferably of a monofilament material of, for example, nylon to effect a cut of circular cross section.

Testing device 10 may be used in many stress corrosive or embrittling environments to indicate the likely performance of structural parts under similar or identical conditions. As was previously indicated, the failure mechanism which the instant testing device is peculiarly well suited to test may be induced under a myriad of processing and environmental service conditions. These conditions include the plating of parts, paint removal and salt-bearing atmospheres.

The subject invention has been described with reference to certain preferred embodiments. It is not intended, however, that the scope and spirit of the appended claims be necessarily limited to the foregoing description.

What is claimed is:

1. A process for fabricating a testing device comprising the steps of:

(a) inserting a pin through first and second diametrically opposed holes in a ring until a head of the pin abuts the outside of the ring next to the first hole and a gripping section of the pin extends radially outward of the second hole;

(b) applying a pure tensile force to the gripping section of the pin to develop a tensile stress at least approximately equal to a predetermined tensile stress in a test section of the pin intermediate the first and second holes in the ring;

(c) applying the reaction force of the tensile force to the ring through a collar disposed on an attachment portion of the pin outside the ring next to the second hole such that the ring is stress deformed into a state defined by a foreshortened ring axis along the axis of the pin and an elongated ring axis transverse to the axis of the pin, the foreshortened and elongated axes being relative to their corresponding axes when the ring is in an unstressed state; and (d) swaging the collar onto the attachment portion by the application of the reaction force of the tensile force on the collar to develop an intimate gripping engagement between the collar and the pin, an intimate bearing relationship between the ring and the collar, and a coaction between the collar, pin and ring which at least approximately maintains the test section of the pin at the predetermined tensile stress and the ring in the stress deformed state, the coaction being maintained after the swaging by the intimate gripping engagement between the collar and the pin and the intimate bearing relationship between the ring and the collar.

2. The process claimed in claim 1 wherein the pin has at least one circumferential groove in its attachment portion, and the collar is swaged into interlocking relationship with the circumferential groove.

3. The process claimed in claim 2 wherein:

the pin has a breaking neck between the gripping section and the attachment portion which will fail at least approximately at the predetermined tensile stress;

the tension application step being applied to the gripping section until the breaking neck fails.

4. The process claimed in claim 3 wherein:

the swaging of the collar is accomplished through the application of the reaction force of the tensile force to the collar's lateral periphery.

5. The process claimed in claim 4 wherein the collar is swaged with a die.

6. The process claimed in claim 4 including the additional step of prestressing the ring prior to assembly in excess of the stress level the ring experiences when assembled, the prestressing being sufficient to deform the outer circumferential portions of the ring to effect a known and repeatable deflection upon the application of the reaction force.

7. The process claimed in claim 6 wherein the tensile force applied to the pin is in excess of the predetermined tensile force, the excess being correlated with the dimensional change of the collar after its swaging such that the predetermined tensile stress is achieved after such dimensional change.

8. The process claimed in claim 7 including the additional step of plating the test device after it has been assembled.

9. The process claimed in claim 8 wherein the test section is fabricated by:

forming a rough circumferential groove in the member; and then drawing a strand across the rough groove in an abrasive bath while simultaneously rotating the pin about its longitudinal axis.

10. A testing device comprising:

(a) a ring under a predetermined compressive load having first and second diametrically opposed holes;

(b) a pin under a predetermined pure tension load having an attachment portion at one end thereof, a head at the other end thereof and a test section defined by a notch intermediate the attachment portion and the head, the pin being disposed through the holes in the ring with the head abutting the ring proximate the outside of the first hole and applying a compressive force to the ring, the attachment portion extending radially outward of the second hole, and the test section being intermediate the first and second holes and under a predetermined pure tensile stress produced by the tension in the pin;

(c) a collar having a bearing surface and unscrewable means to grip the attachment portion, the grip means being in intimate gripping engagement with the pin at the attachment portion thereof outside the second hole and the bearing surface being in intimate bearing with the ring on the surface thereof around the second hole, the pure tension load of the pin being applied to the pin solely by the ring acting through the collar on the attachment portion and by the ring acting directly on the head, the compressive load on the ring being applied by the pure tension load of the pin through the collar and the head, the load on the ring effecting a stress deformed state which produces a foreshortened ring axis along the axis of the pin and an elongated ring axis transverse to the axis of the pin, the foreshortened and elongated ring axes being relative to the corresponding axes of the ring in an unstressed state;

(d) the pin having at least one circumferential groove in the attachment portion; and (e) the collar's grip means including plastically deformable material which is plastically deformed in intimate gripping interlocking engagement with the groove, whereby, the test section is loaded with a pure tensile stress without bending or torsional loads therein.

11. The testing device claimed in claim 10 wherein:

the ring is prestressed prior to assembly in excess of the stress level the ring experiences under the load imposed by the tensioned pin and sufficient to deform the outer circumferential portions of the ring, the prestressing insuring a known and repeatable deflection of the ring in an assembled state.

12. The testing device claimed in claim 10 wherein:

(a) the pin is cylindrical; and (b) the notch is a circumferential groove.

13. The testing device claimed in claim 11 wherein:

(a) the pin is cylindrical; and (b) the notch is a circumferential groove.

References Cited

UNITED STATES PATENTS

| | | | |
|---|---|---|---|
| 3,157,968 | 11/1964 | Kurtz | 51—145 |
| 2,948,996 | 8/1960 | Rule | 51—145 |
| 2,831,343 | 4/1958 | Raring | 73—95 |
| 2,531,048 | 11/1950 | Huck | 85—5 |
| 2,531,049 | 11/1950 | Huck | 85—5 |

FOREIGN PATENTS 139,122  7/1959  U.S.S.R.

OTHER REFERENCES

W. C. Schroeder et al.: U.S. Dept. of Int. Bureau of Mines Bulletin 443. Intercrystalline Cracking of Boiler Steel and Its Prevention, pp. 15 and 16.

RICHARD C. QUEISSER, Primary Examiner

J. WHALEN, Assistant Examiner

U.S. Cl. X.R.

73—86